United States Patent
Doughty et al.

(10) Patent No.: US 9,135,756 B2
(45) Date of Patent: Sep. 15, 2015

(54) PROVIDING COMMUNICATIONS BETWEEN A VEHICLE CONTROL DEVICE AND A USER DEVICE VIA A HEAD UNIT

(71) Applicant: HTI IP, L.L.C., Atlanta, GA (US)

(72) Inventors: John Doughty, Acworth, GA (US); Eric Berkobin, Woodstock, GA (US)

(73) Assignee: HTI IP, L.L.C., Atlanta, GA (US)

( * ) Notice: Subject to any disclaimer, the term of this patent is extended or adjusted under 35 U.S.C. 154(b) by 52 days.

(21) Appl. No.: 13/967,100

(22) Filed: Aug. 14, 2013

(65) Prior Publication Data

US 2015/0051787 A1 Feb. 19, 2015

(51) Int. Cl.
*G01M 17/00* (2006.01)
*G06F 11/00* (2006.01)
*G07C 5/00* (2006.01)
*H04B 7/155* (2006.01)
*G07C 5/08* (2006.01)

(52) U.S. Cl.
CPC .............. *G07C 5/008* (2013.01); *G07C 5/0841* (2013.01); *H04B 7/155* (2013.01)

(58) Field of Classification Search
USPC ............................................ 701/31.5; 714/49
See application file for complete search history.

(56) References Cited

U.S. PATENT DOCUMENTS

| | | | | |
|---|---|---|---|---|
| 8,744,668 B2 * | 6/2014 | Selkirk et al. | ................. | 701/31.4 |
| 8,818,613 B2 * | 8/2014 | Becker et al. | ................. | 701/31.5 |
| 2010/0138701 A1 * | 6/2010 | Costantino | ...................... | 714/49 |
| 2011/0118934 A1 * | 5/2011 | Lowrey et al. | .................. | 701/33 |
| 2011/0153148 A1 * | 6/2011 | Edwards et al. | ................ | 701/30 |
| 2013/0190967 A1 * | 7/2013 | Hassib et al. | ................. | 701/31.5 |
| 2013/0304306 A1 * | 11/2013 | Selkirk et al. | ................. | 701/31.4 |
| 2014/0195108 A1 * | 7/2014 | Schumacher | ................... | 701/36 |

* cited by examiner

*Primary Examiner* — Thomas G Black
*Assistant Examiner* — Tyler Paige

(57) ABSTRACT

A vehicle head unit may receive a request, from a user device and by the head unit, to establish communication with a control device of a vehicle. The control device may be in communication with the head unit via a vehicle communication network associated with the vehicle. The head unit may establish communication between the user device and the control device based on the received request. The head unit may forward a message between the user device and the control device based on the established communication. The message may be forwarded between the user device and the control device via the head unit.

20 Claims, 10 Drawing Sheets

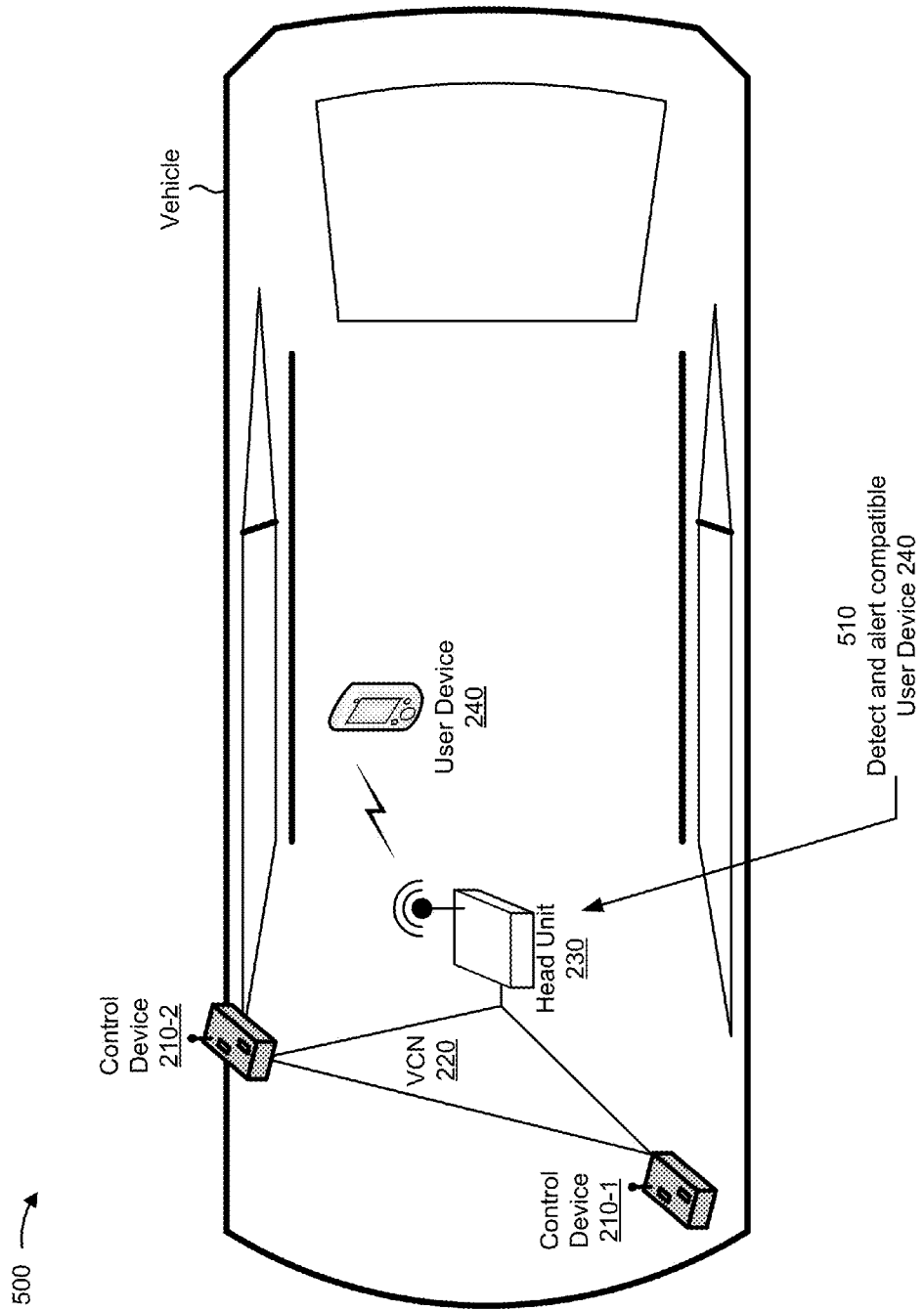

PROVIDING COMMUNICATIONS BETWEEN A VEHICLE CONTROL DEVICE AND A USER DEVICE VIA A HEAD UNIT

BACKGROUND

A telematics device may interface with a vehicle communication bus (e.g., a controller area network (CAN) bus) via an on-board diagnostics II (OBD-II) port. The OBD-II port may be located under the vehicle dashboard so as to provide access to maintenance technicians.

BRIEF DESCRIPTION OF THE DRAWINGS

FIGS. 5A-5E are diagrams of an example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A vehicle (e.g., an automobile) may include self-diagnostic and/or reporting capabilities. The vehicle may include a vehicle communication network (e.g., a controller area network (CAN) bus) through which one or more control devices may provide and/or receive information. A control device may include a sensor device (e.g., an engine temperature sensor, a window position sensor, an alarm activation sensor, etc.), a controller device (e.g., an engine control unit, a transmission control unit, a head unit, etc.), or the like. A telematics device may interface with a control device associated with the vehicle communication network via an OBD-II port. The OBD-II port may be located under the dashboard to facilitate use by a technician, such as during maintenance, diagnostics, emissions testing, or the like. However, the OBD-II port location may be difficult for a driver to access, and may conflict with operation of a vehicle pedal (e.g., a clutch pedal, a brake pedal, a throttle, etc.).

A telematics device typically communicates with an engine control module (ECM) or an engine control unit (ECU), which communicates with various other modules, sensors, control devices, or the like, in the vehicle that are coupled to the vehicle's communication bus. However, the telematics device may also communicate directly with the various modules, sensors, control devices, or other devices coupled to the communication bus of the vehicle. Implementations described herein may assist, or replace, the telematics device in interfacing with the one or more control devices by using a user device (e.g., a smart phone) to configure a head unit to provide the user device with access to the vehicle communication network (e.g., the communication bus). The user device that interfaces with the vehicle's communication bus via the head unit may communicate with the ECM and/or the ECU, in some implementations. Additionally, or alternatively, the user device may communicate directly with a particular module, sensor, control device, and/or system of the vehicle, in some implementations.

Figure 1:
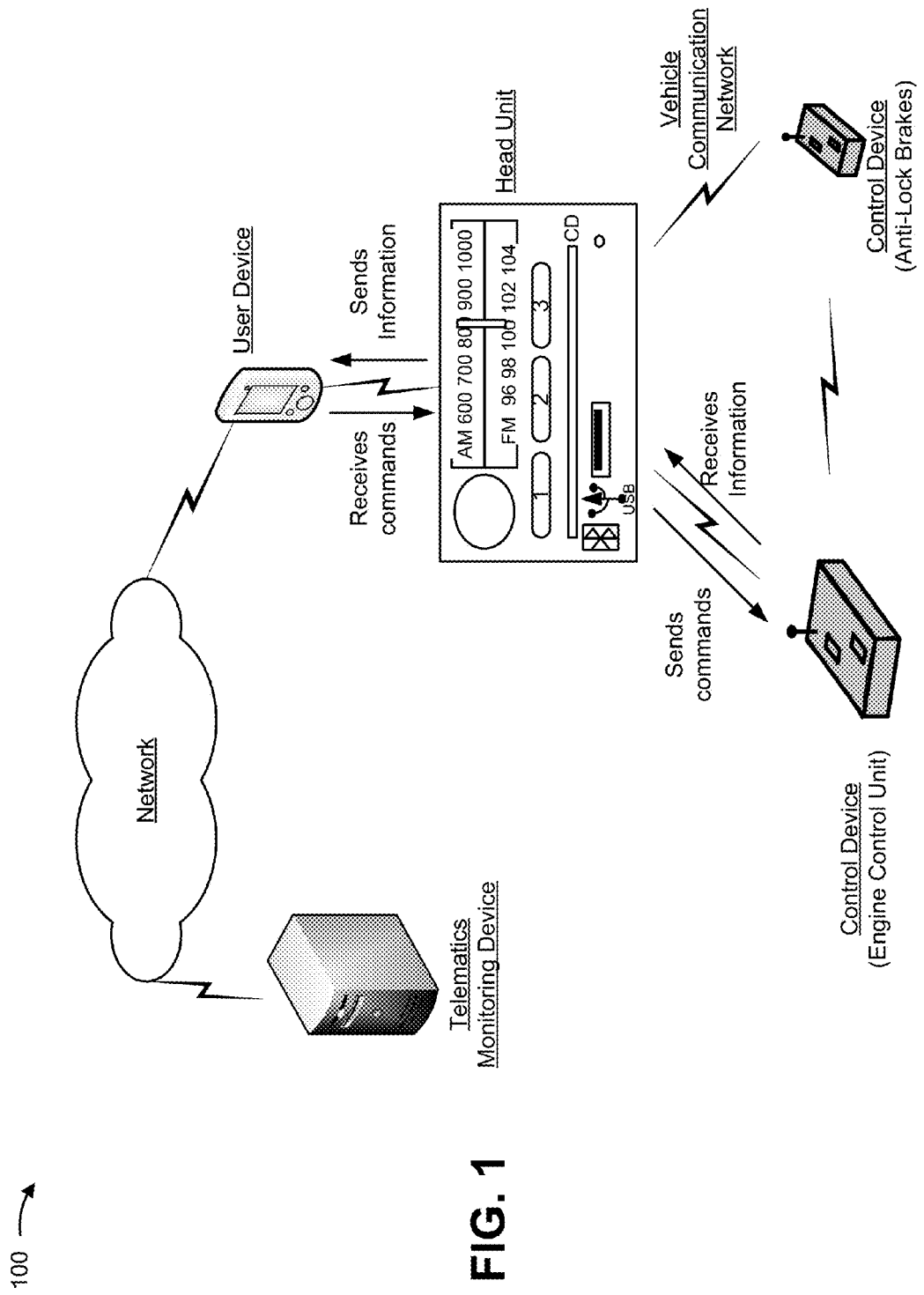
FIG. 1 is a diagram of an overview of an example implementation described herein.

FIG. 1 is a diagram of an overview of an example implementation 100 described herein. Example implementation 100 may include a head unit, a vehicle communication network that includes a communication bus, a user device, one or more control devices, a telematics monitoring device, and a network. Functionality included in the user device, which may wirelessly couple to the vehicle's communication bus via a short range wireless link to the vehicle's head unit, may replace a telematics device that connects to the communication bus via a diagnostic connector, such as, for example, an OBD-II port.

As shown in FIG. 1, the head unit may be connected to the vehicle communication network, such as for controlling a speaker system, operating an air conditioning system, or the like. The user device (e.g., a smart phone) may connect to the head unit via a connection interface (e.g., a Bluetooth connection interface, a personal area network (PAN) connection interface, a wireless local area network (WLAN) connection interface, a universal serial bus (USB) connection interface, etc.). The head unit may be configured to determine a communication protocol associated with the vehicle communication network (e.g., a message-based protocol, such as a CAN bus protocol, a pulse-width modulation protocol, a variable pulse-width protocol, or the like). The head unit may configure a parameter (e.g., a protocol converter parameter), based on the communication protocol, to establish communication between the user device and the vehicle communication network.

As further shown in FIG. 1, the head unit may forward messages, such as commands, requests for information, parameter identifier (PID) messages (e.g., PID request messages), or the like, between the user device and the one or more control devices connected to the vehicle communication network. The user device may communicate with the telematics monitoring device (e.g., via the network), and may provide information associated the one or more control devices (e.g., state information, accessibility information, etc.). The telematics monitoring device may provide information to the user device, such as control device update information, configuration information, or the like, and the user device may use the provided information to adjust the one or more control devices. In this way, a head unit may facilitate communication between a user device and a control device, connected to a vehicle communication network, using a connection between the head unit and the vehicle communication network.

Figure 2:
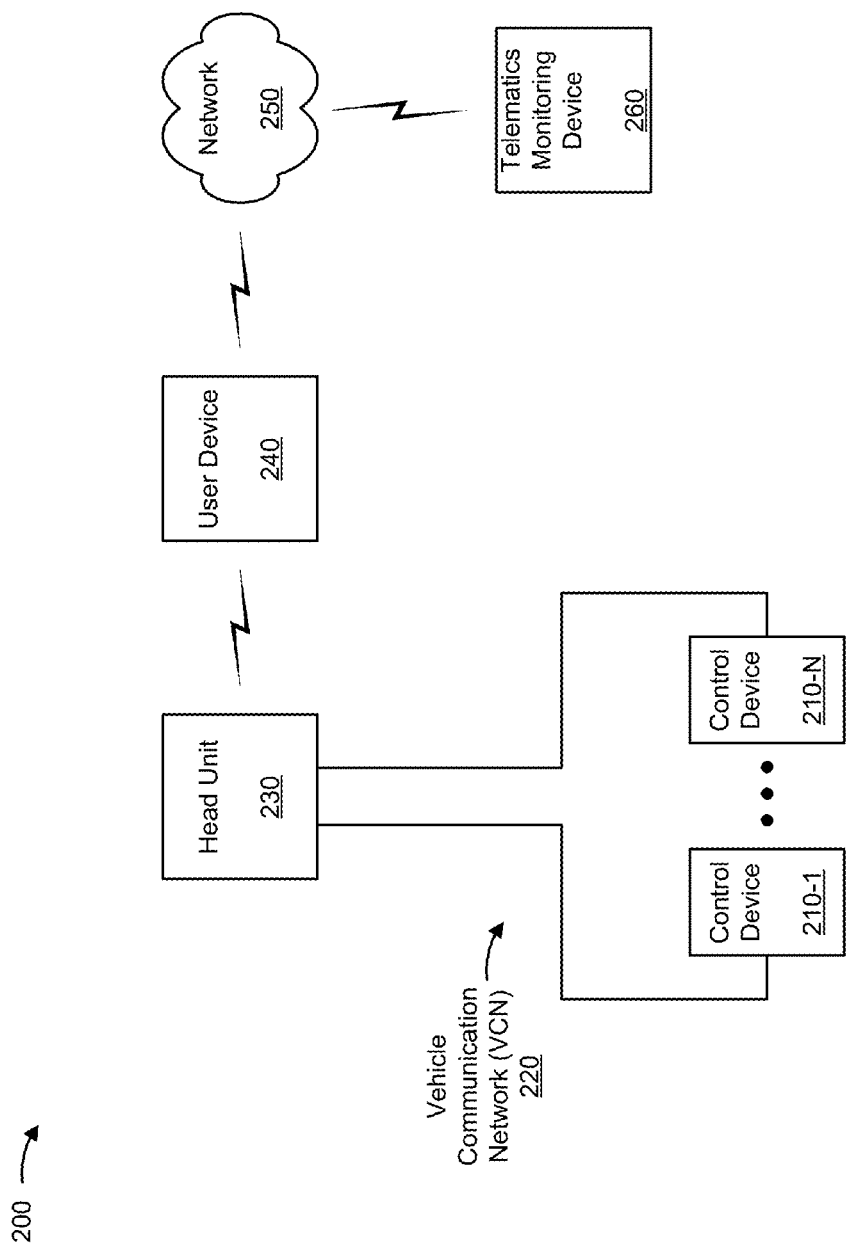
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include control devices 210-1 through 210-N (N≥1) (hereinafter referred to collectively as "control devices 210," and individually as "control device 210"), a vehicle communication network (VCN) 220, a head unit 230, a user device 240, a network 250, and a telematics monitoring device 260. Devices of environment 200 may interconnect via wired connections, wireless connections, or a combination of wired and wireless connections.

Control device 210 may include one or more devices capable of receiving, generating, processing, storing, and/or providing information associated with a state of a vehicle component. For example, control device 210 may include an electronic control unit (e.g., an airbag control unit (ACU), a body control module (BCU), an engine control unit (ECU), an engine control module (ECM), etc.), a sensor (e.g., an occupant sensing system, a seatbelt buckle sensor, an autonomous cruise control sensor, a fuel pressure sensor, an engine temperature sensor, a tire pressure sensor, etc.), a supplementary vehicle instrumentation device (e.g., a trip computer, a carputer, a navigation unit, etc.), or the like. In some implementations, control device 210 may include a communication device capable of receiving information from and/or providing information to user device 240 via VCN 220.

VCN 220 may include one or more wired and/or wireless networks. For example, VCN 220 may include a controller area network (CAN) that allows head unit 230 to communicate with one or more controls devices 210, and/or that allows a particular control device 210 to communicate with one or more other control devices. In some implementations, VCN 220 may include a vehicle bus. In some implementations, VCN 220 may operate using a message-based protocol network, such as a Society of Automotive Engineers (SAE) J1850 pulse-width modulation (PWM) protocol network, an SAE J1850 variable pulse-width (VPW) protocol network, an International Standards Organization (ISO) 914102 protocol network, an ISO 14230 Keyword Protocol 2000 (KWP2000) network, an ISO 15765 CAN protocol network (e.g., a CAN bus network), an SAE J1979 protocol network, or the like. In some implementations, VCN 220 may facilitate the transfer of diagnostic information associated with one or more control devices 210. In some implementations, VCN 220 may include head unit 230, which may be connected to one or more control devices 210 via a vehicle bus.

Head unit 230 may include one or more devices capable of receiving, generating, processing, storing, and/or providing information associated with providing communication between VCN 220 and user device 240. For example, head unit 230 may include a receiver, a car audio system (e.g., a stereo system), a vehicle entertainment system (e.g., combining car audio, navigation, etc.), a BCU (e.g., an air conditioning system control unit), a vehicle control unit (e.g., controlling one or more vehicle systems, such as a door security system, a window operation system, or the like), a secondary instrument panel system (e.g., a system that provides warning information, odometer information, etc.), or the like. In some implementations, head unit 230 may include a communication device capable of providing communication between user device 240 (e.g., via a communication interface) and control device 210 (e.g., via VCN 220). In some implementations, head unit 230 may include one or more connection interfaces, such as a VCN connection interface (e.g., a wired connection to VCN 220, a wireless connection to VCN 220, etc.) and/or a user device connection interface (e.g., a wired connection to user device 240, such as a USB connection, a micro-USB connection, or the like; a wireless connection to user device 240, such as a Wi-Fi connection, a WLAN connection, a Bluetooth connection, a Personal Area Network (PAN) connection, a Near Field Communication (NFC) connection, or the like; etc.). In some implementations, head unit 230 may include a display.

User device 240 may include one or more devices capable of receiving, generating, processing, storing, and/or providing messaging associated with control device 210 (e.g., transmitted and/or received via head unit 230). For example, user device 240 may include a mobile phone (e.g., a smart phone), a radiotelephone, a personal communications system (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a laptop computer, a tablet computer, etc.), or a similar type of device. In some implementations, user device 240 may include one or more applications associated with configuring head unit 230 to forward messages between user device 240 and control device 210. In some implementations, user device 240 may include one or more applications associated with providing a message (e.g., a request for information message, a control message, a system update message, etc.) to and/or receiving a message from control device 210 (e.g., via head unit 230). In some implementations, user device 240 may include one or more applications associated with providing a message to and/or receiving a message from telematics monitoring device 260 (e.g., via network 250).

Network 250 may include one or more wired and/or wireless networks. For example, network 250 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In some implementations, user device 240 may provide information to and/or receive information from telematics monitoring device 260 via network 250.

Telematics monitoring device 260 may include one or devices capable of receiving, generating, processing, storing, and/or providing information associated with control device 210. For example, telematics monitoring device 260 may include a server (e.g., a remote update server, a control server, a cloud update server, or another server that is remote from the vehicle and that monitors data, information, messages, voice calls, etc. to and/or from the vehicle, or the like) capable of receiving information from and/or providing information to user device 240 (e.g., via network 250). In some implementations, telematics monitoring device 260 may store information gathered by control device 210 (e.g., provided via user device 240). In some implementations, telematics monitoring device 260 may provide information associated with configuring head unit 230 and/or control device 210.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
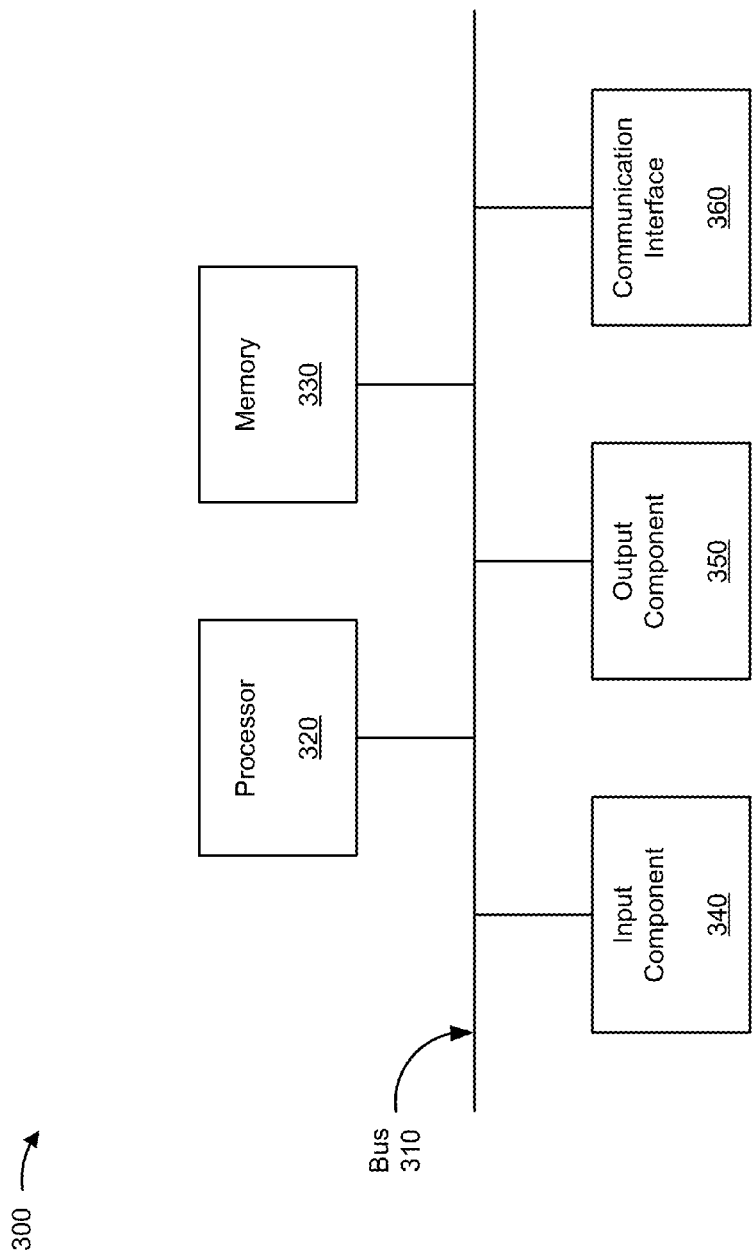
FIG. 3 is a diagram of example components of one or more devices of FIG. 2.

FIG. 3 is a diagram of example components of a device 300. Device 300 may correspond to control device 210, head unit 230, user device 240, and/or telematics monitoring device 260. In some implementations, each of control device 210, head unit 230, user device 240, and/or telematics monitoring device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
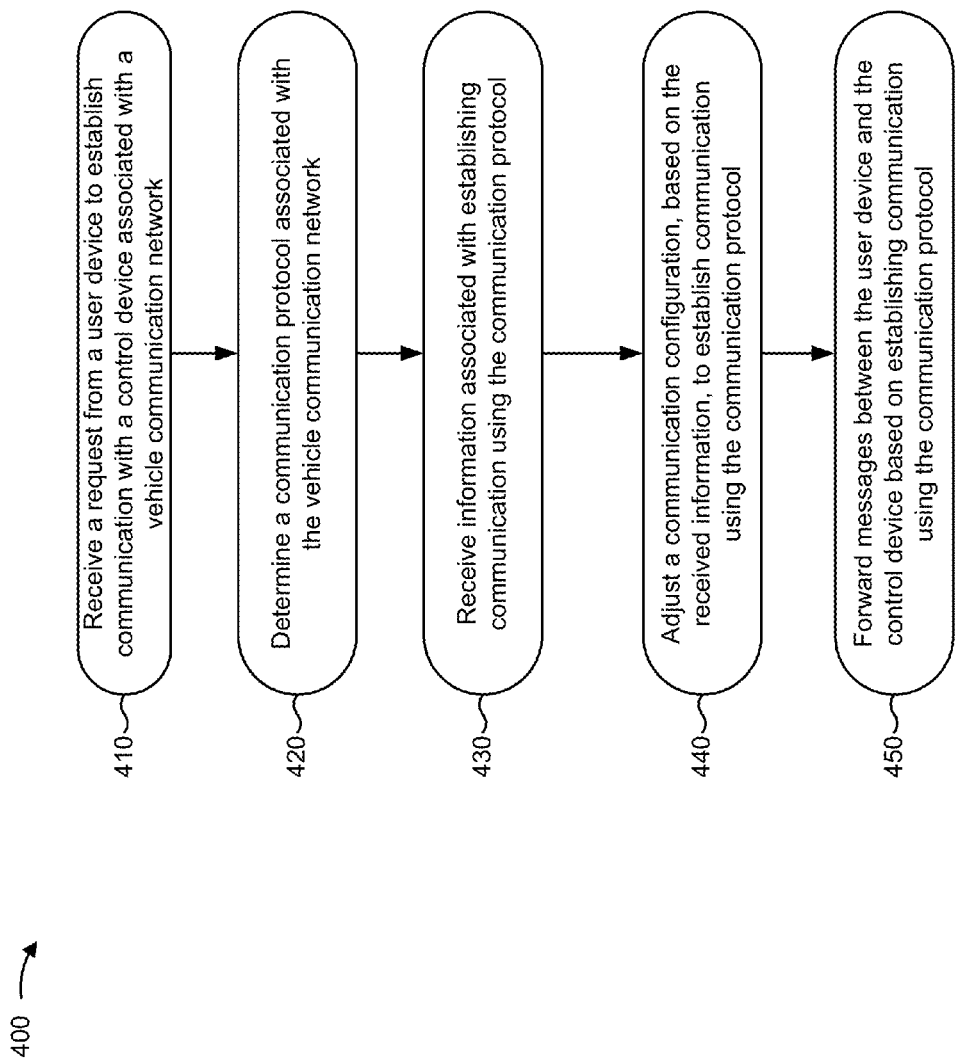
FIG. 4 is a flow chart of an example process for providing communication between a user device and a control device via a head unit.

FIG. 4 is a flow chart of an example process 400 for providing communication between a user device and a vehicle control device via a head unit. In some implementations, one or more process blocks of FIG. 4 may be performed by head unit 230. Additionally, or alternatively, one or more process blocks of FIG. 4 may be performed by another device or a group of devices separate from or including head unit 230, such as control device 210, user device 240, and/or telematics monitoring device 260.

As shown in FIG. 4, process 400 may include receiving a request from a user device to establish communication with a control device associated with a vehicle communication network (block 410). For example, head unit 230 may receive, from user device 240, a request to establish communication with control device 210. In some implementations, head unit 230 may receive the request via user input (e.g., via interaction with a button, a touch screen, etc.). Additionally, or alternatively, head unit 230 may detect that user device 240 is available for communication with control device 210, and may provide an indication that head unit 230 may be used to facilitate the communication. In this case, head unit 230 may receive the request for the communication to be established as a response to the indication that head unit 230 may be used to facilitate the communication.

The request may include authorization information, in some implementations. For example, head unit 230 may request and receive information identifying user device 240 as being authorized to access information associated with control device 210, by implementing a process such as a pairing process, a bonding process, an authentication process, or the like.

The request may include information identifying a connection purpose, in some implementations. For example, user device 240 may request that head unit 230 establish a one-way connection for providing control information to control device 210. Control information may refer to information identifying a configuration adjustment associated with control device 210. For example, when control device 210 is associated with controlling automatic gear shifting, control information may include an indication of the revolutions per minute at which gear shifting is to occur. Additionally, or alternatively, user device 240 may indicate that head unit 230 is to establish one-way communications for providing feedback information from control device 210. Feedback information may include information identifying a state of control device 210, such as diagnostic information, sensor data, sensor information, or the like. For example, user device 240 may indicate that head unit 230 is to establish communication for forwarding diagnostic messages to user device 240. Additionally, or alternatively, user device 240 may indicate that head unit 230 is to establish two-way communications (e.g., for providing control information to and/or receiving feedback information from control device 210).

The request may include information identifying a particular control device 210. For example, head unit 230 may provide information identifying multiple detected control devices 210, and may receive information from user device 240 selecting one or more of the multiple detected control devices 210. In some implementations, user device 240 may indicate that user device 240 is to be in communication with all control devices 210 (e.g., that communication is to be made to VCN 220 for distribution to all control devices 210 associated with VCN 220). In some implementations, the request may include a PID request message.

As further shown in FIG. 4, process 400 may include determining a communication protocol associated with the vehicle communication network (block 420). For example, head unit 230 may determine the communication protocol being used by VCN 220. A communication protocol may refer to one or more digital rules for message exchange with control device 210 via VCN 220, such as a message format rule (e.g., a connector pin usage configuration, a voltage interpretation configuration, a message length limit, a transmission mode configuration, etc.), a message interpretation rule (e.g., an identification of one or more message codes used to request and interpret information, such as a code for requesting fuel system status, a code for providing a value for a fuel pressure, etc.), or the like. For example, VCN 220 may utilize SAE 1979, SAE J1850 PWM, SAE J1850 VPW, ISO 9141-2, ISO 14230 KWP 2000, ISO 15765 CAN, etc. In some implementations, head unit 230 may query control device 210, associated with VCN 220, to determine the communication protocol of VCN 220. Additionally, or alternatively, head unit 230 may identify the communication protocol associated with VCN 220 by retrieving stored information that identifies the communication protocol. Additionally, or alternatively, user device 240 may provide information that identifies the communication protocol. For example, a user of user device 240 may select a vehicle model using user device 240, and user device 240 may determine (e.g., based on stored information, based on querying telematics monitoring device 260 via network 250, etc.) the communication protocol used by VCN 220 associated with the vehicle model.

As further shown in FIG. 4, process 400 may include receiving information associated with establishing communication using the communication protocol (block 430). For example, head unit 230 may receive information, from user device 240, associated with establishing communication using the communication protocol. In some implementations, user device 240 may provide information associated with translating messages from a format used by user device 240 to the communication protocol associated with VCN 220. For example, user device 240 may provide a data structure storing parameter identifications (parameter IDs) that are used by control devices 210 associated with VCN 220. The data structure may be used by head unit 230 in identifying messages to be forwarded to user device 240, in interpreting the messages, in translating the interpreted message into a format that may be sent via a communication link to user device 240, etc.

User device 240 may provide information instructing head unit 230 as to how to communicate with VCN 220, in some implementations. For example, head unit 230 may be configured to communicate with audio equipment on VCN 220, but not with another control device 210 (e.g., an alarm system, a TCU, etc.). In this case, user device 240 may provide information identifying the message format rule and/or the message interpretation rule associated with communicating with the other control device 210 to which user device 240 intends to provide messages and/or from which user device 240 intends to receive messages.

As further shown in FIG. 4, process 400 may include adjusting a communication configuration, based on the received information, to establish communication using the communication protocol (block 440). For example, head unit 230 may establish communication using the communication protocol, based on information received from user device 240. The communication configuration may refer to a message format rule used by head unit 240 to communicate over VCN 220, a message interpretation rule used by head unit 240 to process messages received from and/or transmitted to VCN 220, a message filtering configuration associated with forwarding messages to user device 240, or the like. In some implementations, head unit 230 may configure a communication interface to establish communication with control devices 210 via VCN 220. Additionally, or alternatively, head unit 230 may configure a communication interface (e.g., a different communication interface, the same communication interface, etc.) to establish communication with user device 240.

Establishing communication may include providing confirmation that communication has been established, in some implementations. For example, head unit 230 may provide information to user device 240 informing user device 240 that communication has been established with VCN 220. In this case, the provided information may include information identifying control devices 210. Additionally, or alternatively, the provided information may include information associated with communicating with control device 210 via head unit 230. For example, head unit 230 may provide information identifying a rate at which messages may be forwarded to control device 210, a message length for messages to control device 210, etc. In some implementations, providing information that communication has been established may include informing control device 210 that communication has been established with user device 240. For example, head unit 230 may provide information to control device 210 that indicates that messages may be transmitted to user device 240. Such communication with control devices 210 may occur over a short range wireless link between one or more of control devices 210 and user device 240. Additionally, or alternatively, a vehicle's ECU may act as an interface between a particular control device 210 and user device 240.

In some implementations, establishing communication may include providing a PID request message (or a translated PID request message), received from user device 240, to one or more control devices 210 (e.g., via a vehicle bus of VCN 220).

As further shown in FIG. 4, process 400 may include forwarding messages between the user device and the control device based on establishing communication using the communication protocol (block 450). For example, head unit 230 may forward messages between control device 210 and user device 240. In some implementations, head unit 230 may receive messages from one of control device 210 or user device 240 and provide the messages to the other of control device 210 or user device 240. For example, user device 240 may transmit a request to be provided diagnostic information associated with control device 210, and head unit 230 may receive the request via Bluetooth and re-transmit the request via VCN 220. In some implementations, forwarding messages may include processing the messages. For example, head unit 230 may receive a message from control device 210, and may process the message into a format that may be received by user device 240.

In some implementations, user device 240 may transmit a parameter identifier (PID) request message to head unit 230. A PID request message may refer to a message that includes a parameter identifier (e.g., a PID). A PID may refer to a code used to request information from a vehicle (e.g., control device 210), such as a request for information that represents a vehicle performance parameter. For example, a PID may be defined using SAE standard J1979. Head unit 230 may receive the PID request message from user device 240, and may transmit the PID request message (and/or a portion of the PID request message required to initiate a response to the PID request message) to one or more controls devices 210 over the vehicle bus (e.g., VCN 220).

In some implementations, head unit 230 may transmit (e.g., may forward) the PID request message over the vehicle bus, and every control device 210 connected to the vehicle bus may receive the PID request message. A particular control device 210 that receives the PID request message may determine that the particular control device 210 is responsible for responding to the PID request message, and may provide a response message, via the vehicle bus, to head unit 230. Control device 210 may determine information to include in the response message based on a code included in the PID request message. Head unit 230 may transmit (e.g., may forward) the response message (and/or a portion of the response message requested by user device 210) to user device 210.

Forwarding messages may include filtering messages by head unit 230, in some implementations. For example, user device 240 may provide information to head unit 230 identifying one or more message types that user device 240 intends to receive (e.g., a diagnostic message type, a control message type, etc.). In this case, head unit 230 may receive a message from control device 210, may determine the message type associated with the message, and may selectively forward the message based on the message type and the information identifying the one or more message types that user device 240 intends to receive.

Head unit 230 may provide a message for display, in some implementations. For example, head unit 230 may receive user input indicating a type of message that is to be displayed (such as an engine operation notification), and may display the indicated type of message when the indicated type of message is received for forwarding. In some implementations, user device 240 may not receive information when messages have not been sent for a threshold period of time, and/or when control device 210 feedback has not changed by a threshold quantity for a threshold period of time. For example, when the vehicle is turned off, user device 240 may stop receiving information from control device 210. In this case, head unit 230 may alert user device 240 when head unit 230 detects a change to the engine state (e.g., the car being turned on), so that user device 240 may resume receiving information.

Head unit 230 may forward messages between control device 210 and telematics monitoring device 260, in some implementations. For example, head unit 230 may utilize the connection with user device 240 to communicate with telematics monitoring device 260 via network 250. In some implementations, telematics monitoring device 260 may request information from control device 210 for processing, storage, analysis, or the like.

Telematics monitoring device 260 may provide control information to control device 210, in some implementations. For example, telematics monitoring device 260 may receive information identifying a new configuration for control device 210 (e.g., a different configuration of control device 210 than a current configuration of control device 210). In this case, instead of recalling the vehicle (e.g., requiring that the vehicle be brought to a repair shop to configure control device 210), telematics monitoring device 260 may provide the new configuration to user device 240, and user device 240 may provide the new configuration to control device 210 via head unit 230.

Head unit 230 may validate that an entire message has been transmitted before forwarding the message, in some implementations. For example, when receiving a software update to be forwarded from user device 240 to control device 210, head unit 230 may store the message, and may confirm that the entire message has been stored before forwarding the message. In this way, head unit 230 may avoid forwarding unusable, partial software code. In some implementations, control device 210 may confirm the new configuration by providing information to user device 240 via head unit 230, and user device 240 may provide the confirmation information to telematics monitoring device 260.

In some implementations, user device 240 may provide a user interface (e.g., via an application running on user device 240) that permits a user to provide information that determines a type of message and/or content of a message to be sent to control device 210 via head unit 230. For example, user device 240 may receive user input selecting one or more driving parameters that may affect an insurance score the represents a level of risk and/or a price of an insurance policy. The user may interact with user device 240 to indicate driving parameters to monitor. By selecting particular driving parameters, other (e.g., non-selected) driving parameters may be excluded from determining the insurance score. An insurance provider may determine a price of the insurance policy based on the selected driving parameter. For example, a driver that selects fewer driving parameters to monitor may be assigned an insurance policy with a price that is higher than a driver that selects more driving parameters to monitor. Additionally, or alternatively, user device 240 may receive information (e.g., from a server associated with an insurance provider) that indicates one or more driving parameters to be monitored. In some implementations, the user may not be permitted to select or de-select driving parameters to monitor, as a third party may utilize the indicated driving parameters to provide, for example, an insurance premium to a user associated with user device 240.

As an example, a user may not want the user's location to be monitored (e.g., during a particular period of time). Additionally, or alternatively, the user may not want the user's engine performance parameters to be monitored (e.g., during a particular time period). Thus, the user may not select (e.g., using user device 240) location and/or engine performance parameters, and those parameters may not be retrieved by user device 240 through head unit 230 (e.g., user device 240 may not request the parameters from control device 210 via head unit 230, head unit 230 may determine not to request the parameters from control device 210 based on a message received from user device 240, etc.). Although user device 240, such as a smart phone, may include location determining capabilities and thus may not require retrieval from the vehicle before forwarding to an insurance provider (or another entity having an interest in the user's driver parameters), the user may nevertheless select retrieval of location information from the vehicle to avoid depleting a battery of user device 240 for operating location circuitry.

Additionally, or alternatively, user device 240 may (e.g., via an application running on user device 240) compute a driver score, a risk factor, and/or an insurance rating factor based on monitored driving parameters, vehicle data, and/or vehicle performance data before transmitting the driver score, the risk factor, and/or the insurance rating factor to a third party device (e.g., a device associated with a third party). The third party device may include, for example, a server associated with an insurance provider, a server associated with an insurance broker, a server associated with an entity that accepts bids from insurance providers based on the user's driver score, risk factor, and/or insurance rating factor, or the like. In some implementations, user device 240 may receive input (e.g., from a user) that causes user device 240 to instruct head unit 230 to output monitored vehicle data and/or performance data to a connection port, such as a USB port, so that that the data may be stored on a memory device inserted into connection port. This may allow the user may transfer the stored data and information to another device, such as a personal computer, and transmit the stored data to the third party using the personal computer, or similar device.

In this way, a head unit may utilize a connection with a vehicle communication network to forward messages between a user device and a control device, thereby obviating the need for connection through an OBD-II port.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5B:
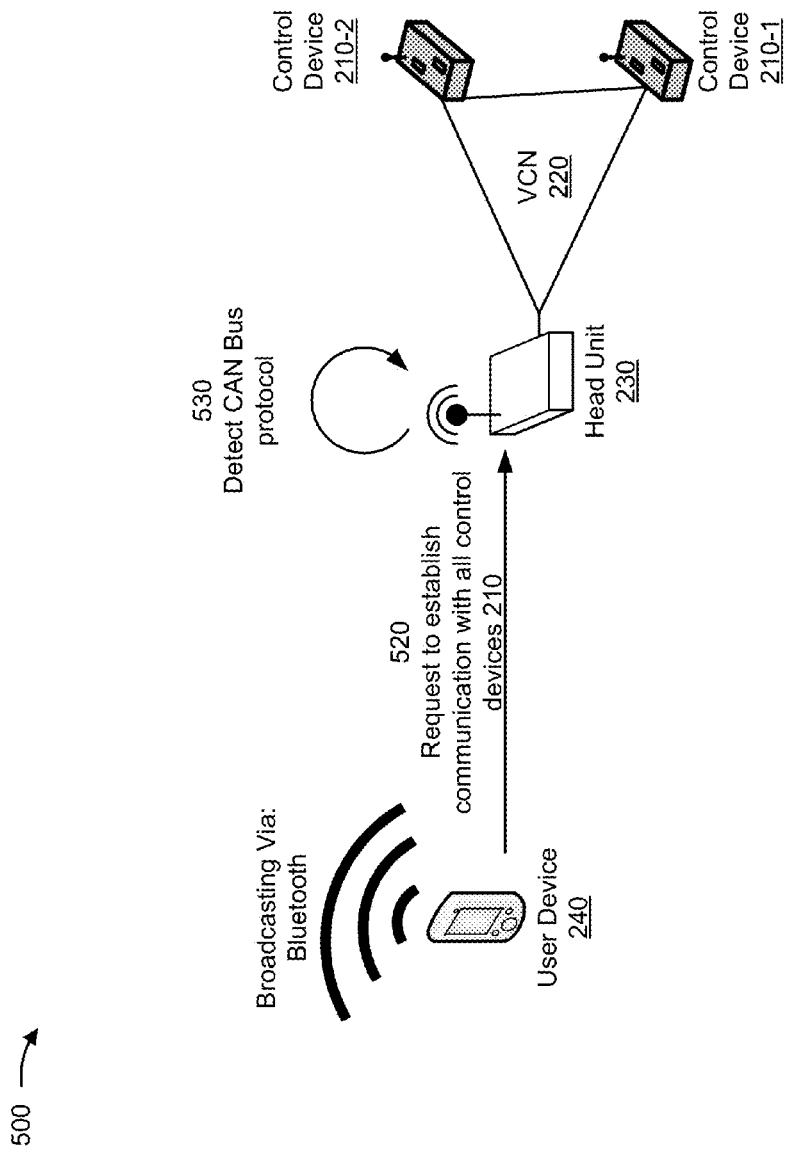

FIGS. 5A-5E are diagrams of an example implementation 500 relating to process 400 shown in FIG. 4. As shown in FIG. 5A, a vehicle may include control device 210-1, control device 210-2, and head unit 230. Control device 210-1, control device 210-2, and head unit 230 may connect via VCN 220 (e.g., a vehicle bus). As shown by reference number 510, when user device 240 enters, comes close to, or is otherwise proximate to the vehicle (e.g., is placed inside the vehicle by a user, enters communication range with head unit 230, etc.) and/or when the vehicle is started, head unit 230 detects user device 240 (e.g., detects a Bluetooth signal from user device 240), connects to user device 240, and alerts user device 240, via the Bluetooth connection, that communication may be established between user device 240 and control devices 210-1 and 210-2.

As shown in FIG. 5B, and by reference number 520, user device 240 requests, via the Bluetooth connection, that communication be established with one or more available control devices, such as controls devices 210-1 and 210-2 (e.g., an engine control unit). As shown by reference number 530, head unit 230 detects a communication protocol associated with VCN 220. In this case, head unit 230 detects a CAN Bus protocol (e.g., ISO 15765 CAN), and configures a parameter to receive messages from control devices 210-1 and 210-2 sent over VCN 220 using the CAN Bus protocol.

Figure 5C:
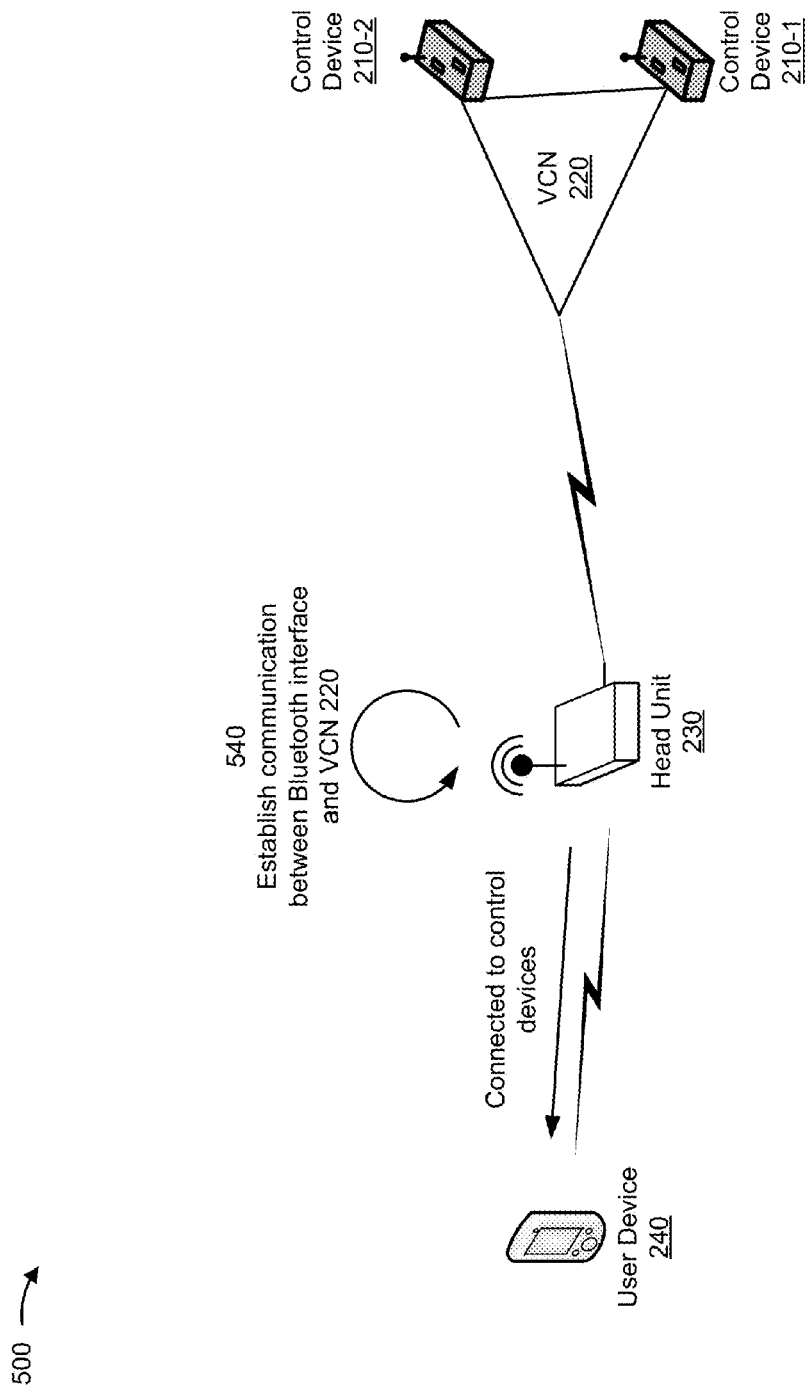

As shown in FIG. 5C, and by reference number 540, head unit 230 establishes communication between user device 240 (e.g., via a Bluetooth interface) and control devices 210-1 and 210-2 (e.g., via VCN 220). Head unit 230 provides information to user device 240 confirming that a connection has been established with control devices 210-1 and 210-2, and waits for messages to be forwarded between user device 240 and control devices 210-1 and 210-2.

Figure 5D:
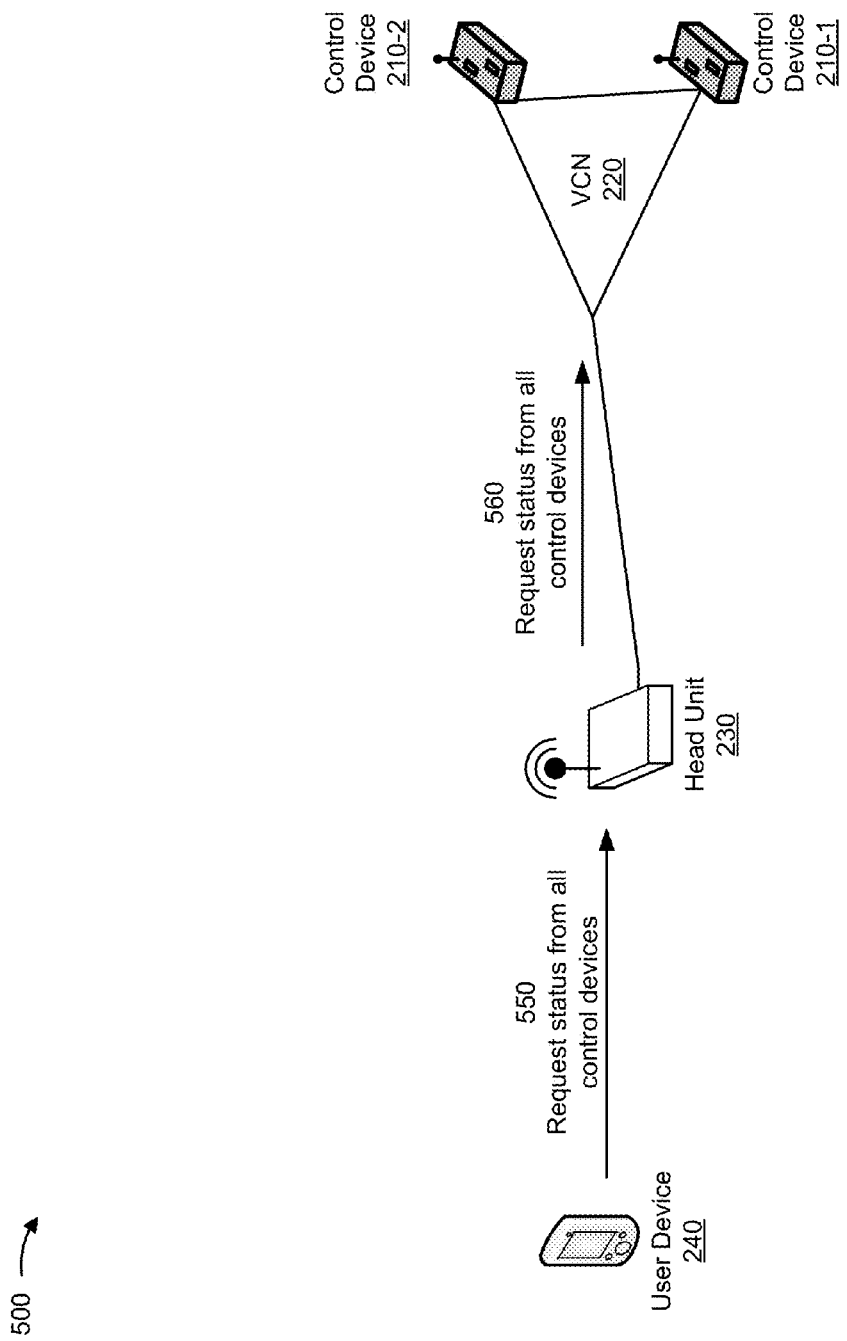

As shown in FIG. 5D, and by reference number 550, user device 240 requests a status from all control devices (e.g., from control devices 210-1 and 210-2). For example, user device 240 may transmit a PID request message to head unit 230. As shown by reference number 560, head unit 230 forwards the PID request message to VCN 220, where the PID request message is received by control device 210-1 and control device 210-2.

Figure 5E:
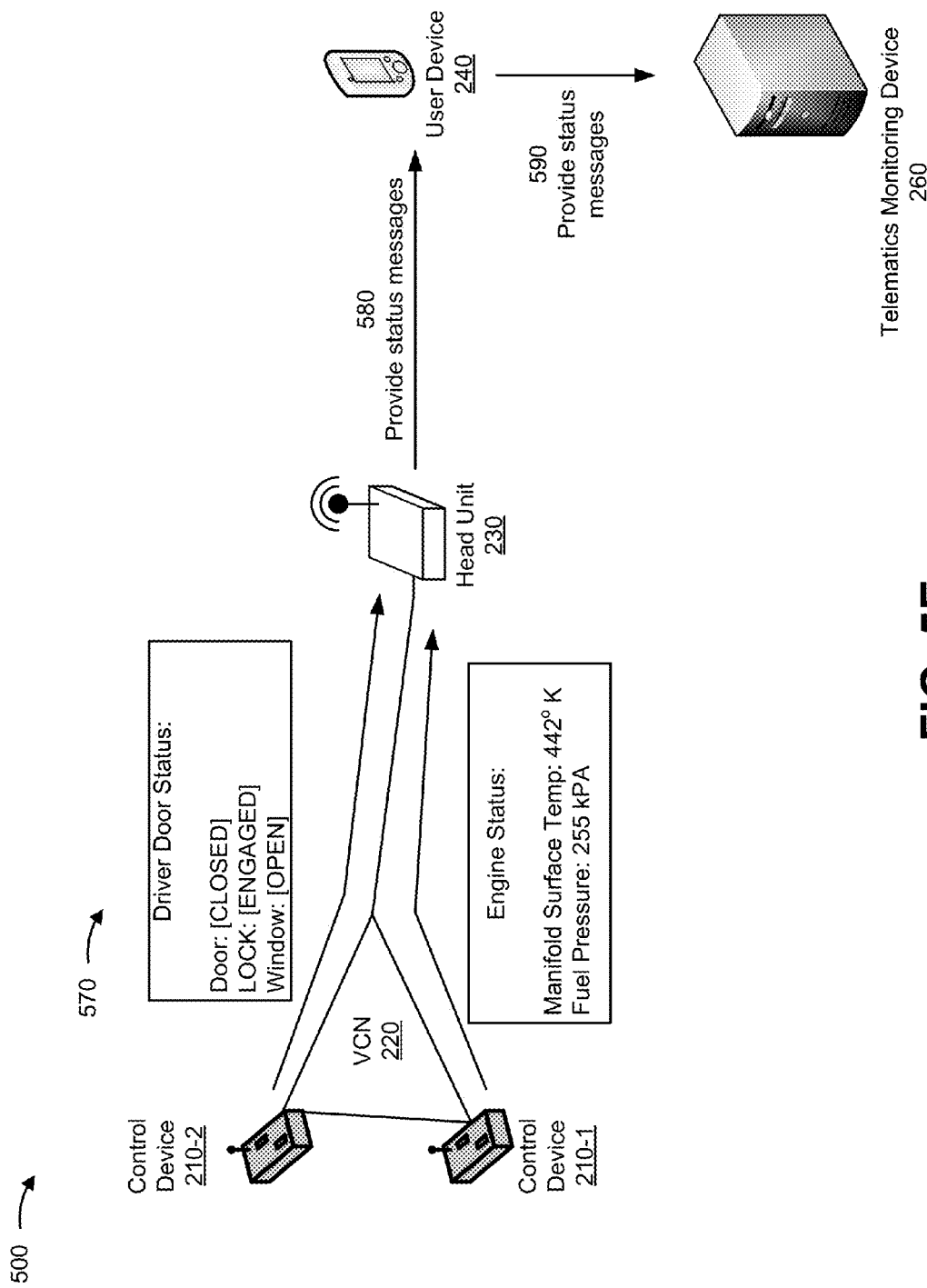

As shown in FIG. 5E, control device 210-1 and control device 210-2 provide status messages 570 (e.g., one or more response messages, such as a "Driver Door Status" message and an "Engine Status" message). Head unit 230 receives messages 570 and, as shown by reference number 580, forwards messages 570 to user device 240. As shown by reference number 590, user device 240 receives messages 570 (e.g., responses to the status request), and provides messages 570 to telematics monitoring device 260 for storage and processing.

As indicated above, FIGS. 5A-5E are provided merely as an example. Other examples are possible and may differ from what was described with regard to FIGS. 5A-5E.

Figure 6:
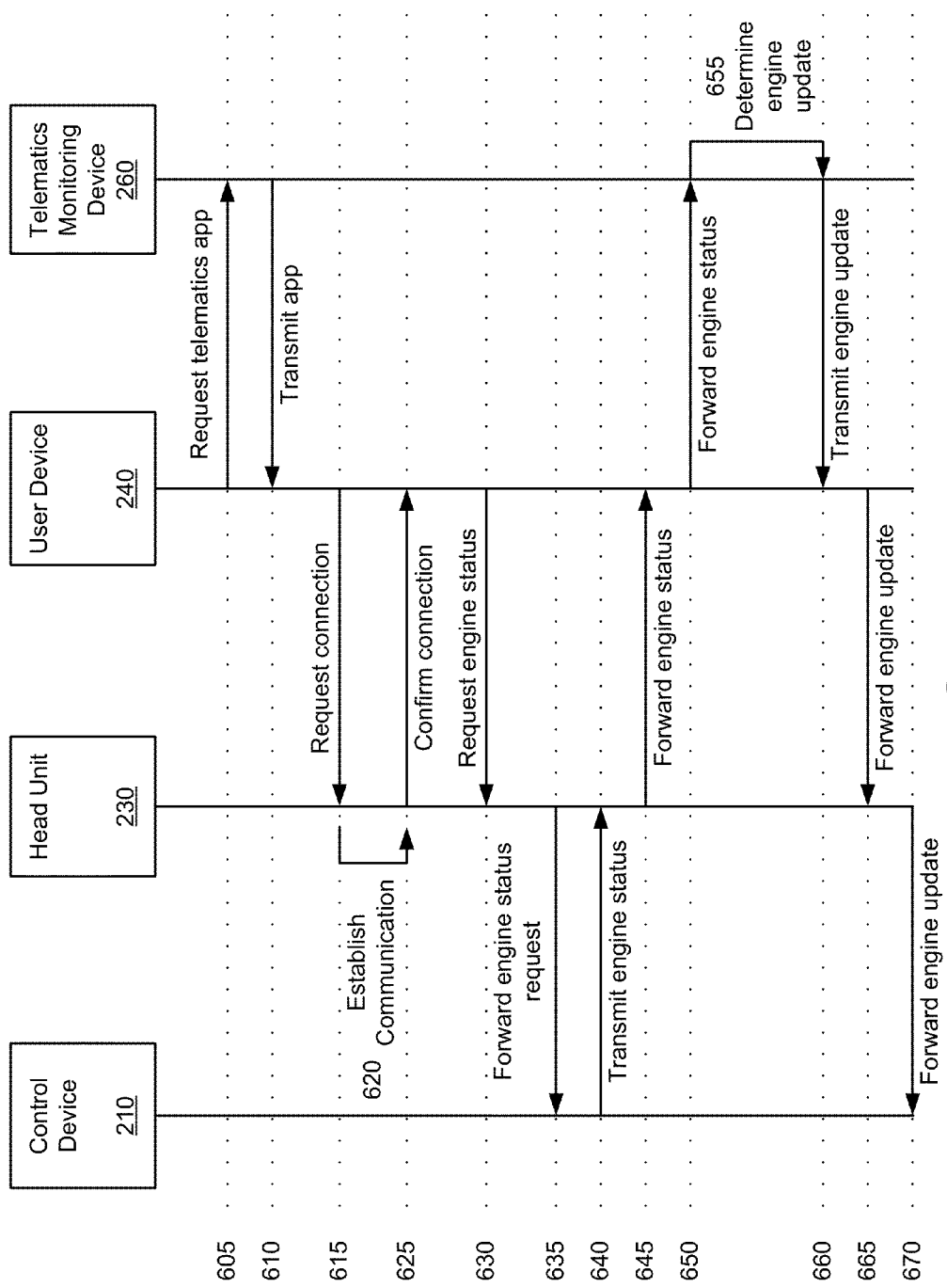
FIG. 6 is a diagram of an example call flow for providing communication between a user device and a control device via a head unit.

FIG. 6 is a diagram of an example call flow 600 for providing communication between a user device and a vehicle control device via a head unit.

As shown by reference number 605, call flow 600 may include transmitting, by a user device 240 and to a telematics monitoring device 260, a request for a telematics application (e.g., a mobile application for communicating with a control device 210 via a head unit 230). The request for the telematics application may include information identifying a particular VCN 220 over which user device 240 is to communicate with control device 210 (e.g., based on a particular vehicle make and/or model).

As shown by reference number 610, call flow 600 may include transmitting, by telematics monitoring device 260 and to user device 240, the telematics application (e.g., via network 250). The telematics application may include information to be used in configuring messages based on the particular vehicle associated with control device 210. For example, the telematics application may include information associated with interpreting messages sent by control device 210 via VCN 220.

As shown by reference number 615, call flow 600 may include transmitting, by user device 240 and to head unit 230, a request for communication to be established with control device 210. The request may include information stored by the telematics application that may be used by head unit 230 in adjusting a communication configuration to establish the communication.

As shown by reference number 620, call flow 600 may include establishing, by head unit 230, communication between user device 240 and control device 210. For example, head unit 230 may configure a Bluetooth interface with user device 240 to send and receive messages with user device 240, and may configure a VCN interface to send and receive messages with control device 210 (e.g., via VCN 220). Head unit 230 may utilize information, provided by user device 240 from the application, to configure translation of parameter IDs received from control device 210 to a format compatible with the Bluetooth interface.

As shown by reference number 625, call flow 600 may include transmitting, by head unit 230 and to user device 240, confirmation that the communication connection has been established. For example, head unit 230 may transmit information identifying control device 210 to user device 240, and may transmit information indicating that messages may be transmitted to control device 210 (e.g., via head unit 230).

As shown by reference number 630, call flow 600 may include transmitting, by user device 240 and to head unit 230, a request for engine status from control device 210. For example, user device 240 may transmit a message for head unit 230 to forward to control device 210 that instructs control device 210 to respond with the status of a sensor associated with control device 210 and/or data corresponding to a monitored aspect associated with control device 210 (e.g., an engine sensor, such as an engine temperature sensor, an engine fuel-pressure sensor, or the like).

As shown by reference number 635, call flow 600 may include forwarding, by head unit 230 and to control device 210, the engine status request (e.g., via VCN 220). For example, head unit 230 may determine a parameter ID associated with requesting the status of the sensor associated with control device 210, and may transmit the parameter ID via VCN 220.

As shown by reference number 640, call flow 600 may include transmitting, by control device 210 and to head unit 230, a response to the engine status request (e.g., information identifying an engine status). For example, control device 210 may receive the parameter ID indicating that control device 210 is to provide the status of the sensor. In this case, control device 210 may determine the status of the sensor, may determine another parameter ID associated with providing the status of the sensor, and may transmit the other parameter ID.

As shown by reference number 645, call flow 600 may include forwarding, by head unit 230 and to user device 240, the response to the engine status request. For example, head unit 230 may receive the other parameter ID (e.g., via VCN 220), and may determine that the other parameter ID indicates a message, from control device 210, that is to be forwarded to user device 240. In this case, head unit 230 may translate the other parameter ID into a format capable of being received by user device 240, and may transmit the translated message.

As shown by reference number 650, call flow 600 may include forwarding, by user device 240 and to telematics monitoring device 260, the response to the engine status request. For example, user device 240 may determine, based on receiving the translated message from head unit 230, that the message indicates an obsolete engine configuration, and may forward the message to telematics monitoring device 260 (e.g., via network 250) for processing.

As shown by reference number 655, call flow 600 may include determining, by telematics monitoring device 260, an update to control device 210. Telematics monitoring device 260 may analyze the response to the engine status request to determine a current engine performance value. Telematics monitoring device 260 may determine, based on the current engine performance value, that improved performance is to be achieved by an updated configuration for control device 210 (e.g., a change to a parameter used by control device 210 in controlling the vehicle engine, such as a fuel pressure change, a fuel injection rate change, a fuel-air mixture change, etc.).

As shown by reference number 660, call flow 600 may include transmitting, by telematics monitoring device 260 and to user device 240, an engine update based on determining that improved performance is to be achieved by an updated configuration for control device 210. For example, telematics monitoring device 260 may create a message that includes the updated configuration for control device 210, and may transmit the message to user device 240.

As shown by reference number 665, call flow 600 may include forwarding, by user device 240 and to head unit 230, the engine update. For example, user device 240 may receive the message from telematics monitoring device 260, and may determine that the message includes an updated configuration for control device 210. In this case, user device 240 may forward the message to head unit 230 for further forwarding to control device 210.

As shown by reference number 670, call flow 600 may include forwarding, by head unit 230 and to control device 210, the engine update. Control device 210 may adjust a configuration based on the engine update, and may improve engine performance based on adjusting the configuration.

As indicated above, FIG. 6 is provided merely as an example. Other examples are possible and may differ from what was described with regard to FIG. 6.

Implementations described herein may allow a head unit to establish a communication connection between a user device (e.g., a mobile phone) and a control device associated with a vehicle communication network without the user device connecting to an inconveniently located OBD-II port. Furthermore, a telematics monitoring device may communicate with the control device via a network connection with the user device and the communication connection between the user device and the control device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A head unit, comprising:
   one or more processors to:
   receive a request, from a user device, to establish communication with one or more control devices of a vehicle,
   the one or more control devices being in communication with the head unit via a vehicle communication network associated with the vehicle;
   establish communication between the user device and the one or more control devices based on the received request,
   the communication between the user device and the one or more control devices of the vehicle being established independent of a wired on-board diagnostics port; and
   forward a message between the user device and the one or more control devices based on the established communication,
   the message being forwarded between the user device and the one or more control devices via the head unit.

2. The head unit of claim 1, where the message being forwarded between the user device and the control device via the head unit includes a parameter identifier (PID) request message.

3. The head unit of claim 2, where the PID request message includes a request for information associated with performance of the vehicle.

4. The head unit of claim 1, where the one or more processors, when establishing communication between the user device and the one or more control devices, are further to:
   establish communication with the user device via a wireless interface;
   establish communication with the one or more control devices via the vehicle communication network,
   the communication with the one or more control devices via the vehicle communication network being established using a wired connection; and
   where the one or more processors, when forwarding the message between the user device and the one or more control devices, are further to:
   receive the message from the user device via the wireless interface; and
   forward the message to the one or more control devices via the vehicle communication network.

5. The head unit of claim 1, where the one or more processors are further to:
receive configuration information from the user device,
the configuration information identifying a message format associated with the vehicle communication network,
the vehicle communication network being a network over which the message is to be transmitted to the one or more control devices; and
where the one or more processors, when establishing communication between the user device and the one or more control devices, are further to:
establish communication between the user device and the one or more control devices based on the received configuration information.

6. The head unit of claim 1, where the one or more processors are further to:
receive information associated with configuring the head unit to establish communication between the user device and the one or more control devices; and
where the one or more processors, when establishing communication between the user device and the one or more control devices, are further to:
establish communication between the user device and the one or more control devices based on receiving the information associated with configuring the head unit.

7. The head unit of claim 1, where the one or more processors are further to:
receive connection information, from the user device, indicating that communication is to be established between the user device and the one or more control devices when the user device is detected in proximity to the head unit;
store the connection information indicating that communication is to be established;
detect that the user device is in proximity to the head unit; and
where the one or more processors, when establishing communication between the user device and the one or more control devices, are further to:
establish communication between the user device and the one or more control devices based on the stored connection information and further based on detecting that the user device is in proximity to the head unit.

8. A non-transitory computer-readable medium storing instructions, the instructions comprising:
one or more instructions that, when executed by one or more processors, cause the one or more processors to:
receive, via a wireless network, a request to establish communication between a user device and a control device associated with a vehicle,
the control device being associated with a vehicle communication network of the vehicle;
establish communication between the user device and the control device based on the received request,
the communication between the user device and the control device being established independent of a wired on-board diagnostics port; and
forward a response message, received from the control device via the vehicle communication network, to the user device, via the wireless network, based on establishing the communication.

9. The non-transitory computer-readable medium of claim 8, where the request includes a parameter identifier that identifies a parameter associated with the vehicle.

10. The non-transitory computer-readable medium of claim 9, where the one or more instructions, that cause the one or more processors to establish communication between the user device and the control device, further cause the one or more processors to:
provide the parameter identifier to the control device via the vehicle communication network.

11. The non-transitory computer-readable medium of claim 10, where the one or more instructions, that cause the one or more processors to forward the response message to the user device, further cause the one or more processors to:
receive the response message from the control device via the vehicle communication network based on providing the parameter identifier to the control device; and
forward the received response message to the user device via the wireless network.

12. The non-transitory computer-readable medium of claim 8, where the one or more instructions, when executed by the one or more processors, further cause the one or more processors to:
receive the response message via a wired connection associated with the vehicle communication network; and
where the one or more instructions, that cause the one or more processors to forward the response message, further cause the one or more processors to:
forward the message based on receiving the response message via the wired connection.

13. The non-transitory computer-readable medium of claim 8, where the one or more instructions, when executed by the one or more processors, further cause the one or more processors to:
identify the control device;
provide information identifying the control device to the user device;
receive information indicating that the user device intends to be forwarded the response message from the control device based on the information identifying the control device; and
where the one or more instructions, that cause the one or more processors to forward the response message, further cause the one or more processors to:
forward the response message based on the information indicating that the user device intends to be forwarded the response message from the control device.

14. The non-transitory computer-readable medium of claim 8, where the one or more instructions, when executed by the one or more processors, further cause the one or more processors to:
receive a parameter identifier from the user device via the wireless network;
provide the parameter identifier to the control device via the vehicle communication network;
receive the response message from the control device, via the vehicle communication network, based on providing the parameter identifier to the control device; and
where the one or more instructions, that cause the one or more processors to forward the response message to the user device, further cause the one or more processors to:
forward the response message to the user device based on receiving the response message from the control device.

15. The non-transitory computer-readable medium of claim 8, where the one or more instructions, when executed by the one or more processors, further cause the one or more processors to:
determine that the user device is within a wireless communication range of a head unit of the vehicle; and where the one or more instructions, that cause the one or more processors to establish communication between the user device and the control device, further cause the one or more processors to:
 establish communication between the user device and the control device based on determining that the user device is within the wireless communication range of the head unit.

16. A method, comprising:
 receiving, by a head unit of a vehicle, a request to establish communication with one or more control devices, associated with a vehicle communication network of the vehicle, and with a user device;
 establishing, by the head unit, communication between the user device and the one or more control devices based on the received request to establish communication,
  the communication between the user device and the one or more control devices being established without using a wired on-board diagnostics port;
 receiving, by the head unit, a message in a first format based on the established communication;
 translating, by the head unit, the message from the first format to a second format; and
 delivering, by the head unit, the message in the second format.

17. The method of claim 16, where the message in the first format includes one of:
 a parameter identifier (PID) request message, or
 a response message, the response message being in response to the PID request message; and
 where the message in the second format includes the other of:
  the PID request message, or
  the response message.

18. The method of claim 16, further comprising:
 receiving information associated with updating a parameter of a particular control device, of the one or more control devices, from a telematics monitoring device and via the user device,
  the telematics monitoring device being connected to the user device via a network; and
 where delivering the message further comprises:
  delivering the information associated with updating the parameter to the particular control device;
  determining that the delivered information associated with updating the parameter was received by the particular control device; and
  providing, to the telematics monitoring device and via the user device, confirmation that the information associated with updating the parameter was received by the particular control device based on determining that the delivered information associated with updating the parameter was received by the particular control device.

19. The method of claim 16, further comprising:
 determining that the user device is connected to the head unit via a connection;
 determining that the user device is capable of having communication established with the one or more control devices; and
 where receiving the request to establish communication further comprises:
  receiving the request based on determining that the user device is connected to the head unit via the connection; and
 where receiving the message or delivering the message further comprises:
  receiving the message or delivering the message using the connection.

20. The method of claim 16, where receiving the message in the first format further comprises:
 receiving the message from the user device;
 determining, based on the first format, that the message is intended for a particular control device of the one or more control devices;
 determining a recipient indicator, associated with the second message format,
  the recipient indicator indicating that the particular control device, of the one or more control devices, is to receive the message and that other control devices, of the one or more control devices, are not to receive the message; and
 where translating the message from the first format to the second format further comprises:
  processing the message to include the recipient indicator; and
 where delivering the message in the second format further comprises:
  delivering the processed message to the particular control device.

* * * * *